US012459571B2

(12) United States Patent
Fredenburg et al.

(10) Patent No.: US 12,459,571 B2
(45) Date of Patent: Nov. 4, 2025

(54) UTILITY VEHICLE WITH ANGLED TANK

(71) Applicant: EXMARK MANUFACTURING COMPANY INCORPORATED, Beatrice, NE (US)

(72) Inventors: Michael S. Fredenburg, Hickman, NE (US); Jonathan S. Guarneri, Lincoln, NE (US); Patrick D. Sands, Firth, NE (US); Derek L. Dragoo, Clatonia, NE (US); Kevin J. Nelson, Lincoln, NE (US); Daniel L. Mawer, Savage, MN (US)

(73) Assignee: EXMARK MANUFACTURING COMPANY INCORPORATED, Beatrice, NE (US)

( * ) Notice: Subject to any disclaimer, the term of this patent is extended or adjusted under 35 U.S.C. 154(b) by 0 days.

(21) Appl. No.: 18/909,373

(22) Filed: Oct. 8, 2024

(65) Prior Publication Data

US 2025/0145217 A1    May 8, 2025

Related U.S. Application Data

(60) Provisional application No. 63/595,506, filed on Nov. 2, 2023.

(51) Int. Cl.
*B62D 21/02*    (2006.01)
*B62D 21/18*    (2006.01)
*B62D 33/02*    (2006.01)

(52) U.S. Cl.
CPC ........... *B62D 21/02* (2013.01); *B62D 21/186* (2013.01); *B62D 33/02* (2013.01)

(58) Field of Classification Search
CPC .............. B60Y 2200/223; B60K 15/03; B60K 15/03006; B60K 15/073; B60K 15/07;
(Continued)

(56) References Cited

U.S. PATENT DOCUMENTS 6,948,739 B2    9/2005  Gallagher et al.
7,318,311 B2 *  1/2008  Wright .................. A01D 34/74
                                                    56/17.1

(Continued)

FOREIGN PATENT DOCUMENTS

WO    WO 2017/214467 A1    12/2017

OTHER PUBLICATIONS

Parent U.S. Appl. No. 63/595,506, filed Nov. 2, 2023, The Toro Company.

(Continued)

*Primary Examiner* — Paul N Dickson
*Assistant Examiner* — Maxwell L Meshaka
(74) *Attorney, Agent, or Firm* — Mueting Raasch Group (57) ABSTRACT

The utility vehicle that includes a frame carrying a prime mover and extending between a first end and a second end in a longitudinal direction. The vehicle also includes ground engaging members operatively attached to the frame. At least one of the ground engaging members is powered by the prime mover to propel the frame over a ground surface. Also, the vehicle includes a control tower (supporting operator controls) located at or near a rear end of the frame, a tank positioned lateral to the control tower, and a support pad connected to the control tower and configured to contact a leg of an operator. Further, a pad surface of the support pad is configured to align with a portion of an angled surface of the tank. Therefore, an operator leaning against the pad surface and angled surface of the tank experiences a smooth transition therebetween.

19 Claims, 10 Drawing Sheets

(58) Field of Classification Search
CPC ...... B62J 9/26; B62J 9/25; B60N 2/68; B62D 21/186; B62D 21/02
See application file for complete search history.

(56) References Cited

U.S. PATENT DOCUMENTS

| | | | | |
|---|---|---|---|---|
| 7,607,283 | B2 * | 10/2009 | Wright | A01D 34/74 56/17.1 |
| 7,793,979 | B2 | 9/2010 | Kraimer et al. | |
| 8,262,104 | B2 | 9/2012 | Kallevig et al. | |
| 9,516,809 | B2 * | 12/2016 | Wright | A01D 34/74 |
| 9,815,364 | B2 * | 11/2017 | Sharkar | B60K 15/067 |
| 10,538,179 | B2 * | 1/2020 | Asahara | F02M 37/0017 |
| 11,299,040 | B2 * | 4/2022 | Moore | B60K 15/03177 |
| 11,499,470 | B2 * | 11/2022 | Tate | F01P 11/12 |
| 11,533,842 | B2 * | 12/2022 | Fredenburg | A01D 34/74 |
| D974,415 | S * | 1/2023 | Nelson | D15/28 |
| 11,572,843 | B2 * | 2/2023 | Greenlaw | B60K 15/063 |
| 11,849,667 | B2 * | 12/2023 | Moore | A01D 34/001 |
| 12,063,883 | B2 * | 8/2024 | Fredenburg | A01D 34/82 |
| 2007/0039304 | A1 * | 2/2007 | Wright | A01D 34/74 56/14.9 |
| 2008/0072559 | A1 * | 3/2008 | Wright | A01D 34/685 56/14.9 |
| 2014/0048541 | A1 * | 2/2014 | Pirtle | B60K 15/073 29/428 |
| 2015/0359173 | A1 * | 12/2015 | Wright | A01D 34/74 56/17.1 |
| 2017/0166044 | A1 * | 6/2017 | Asahara | F02M 37/0017 |
| 2017/0190247 | A1 * | 7/2017 | Sharkar | A01D 34/82 |
| 2020/0282826 | A1 * | 9/2020 | Moore | B60K 15/03 |
| 2021/0087982 | A1 * | 3/2021 | Greenlaw | B60K 15/063 |
| 2021/0105938 | A1 * | 4/2021 | Fredenburg | A01D 34/283 |
| 2021/0227745 | A1 * | 7/2021 | Fredenburg | A01D 34/82 |
| 2021/0340898 | A1 * | 11/2021 | Tate | F01P 1/02 |
| 2022/0201933 | A1 * | 6/2022 | Fredenburg | A01D 34/661 |
| 2023/0210047 | A1 * | 7/2023 | Moore | A01D 34/001 280/32.5 |
| 2023/0270046 | A1 * | 8/2023 | Fredenburg | A01D 34/66 280/43 |
| 2024/0147897 | A1 * | 5/2024 | Moore | A01D 34/001 |
| 2024/0208379 | A1 * | 6/2024 | Kondou | B60N 2/686 |
| 2024/0397860 | A1 * | 12/2024 | Fredenburg | A01D 34/74 |
| 2024/0423126 | A1 * | 12/2024 | Nelson | A01D 69/02 |

OTHER PUBLICATIONS

IDS NPL Document 1, Scag V-Ride Bolster, Scag Power Equipment, Mayville, WI; Product believed available at least as early as Mar. 28, 2018; 1 page.

IDS NPL Document 2, Toro Dingo TX1000W, The Toro Company, Minneapolis, MN; Product believed available at least as early as Mar. 28, 2018; 1 page.

* cited by examiner

UTILITY VEHICLE WITH ANGLED TANK

This application claims priority to and/or the benefit of U.S. Provisional Patent App. No. 63/595,506, filed 2 Nov. 2023, which is incorporated herein by reference in its entirety.

TECHNOLOGICAL FIELD

Embodiments of the present disclosure generally relate to utility vehicles such as, e.g., compact utility loaders, mowers, ground treatment vehicles, sprayer spreaders, etc., having an operator support pad proximate a tank.

SUMMARY

Embodiments of the present disclosure disclosed herein relate to a utility vehicle. The utility vehicle may include a frame carrying a prime mover and extending between a first end and a second end in a longitudinal direction. The vehicle may also include ground engaging members operatively attached to the frame. At least one of the ground engaging members may be powered by the prime mover to propel the frame over a ground surface. Also, the vehicle may include a control tower located at or near a rear end of the frame, a tank positioned lateral to the control tower, and a support pad connected to the control tower and configured to contact a leg of an operator. The control tower may be carrying controls configured to be manipulated by the operator. Further, a pad surface of the support pad may be configured to align with a portion of an angled surface of the tank.

The above summary is not intended to describe each embodiment or every implementation. Rather, a more complete understanding of illustrative embodiments will become apparent and appreciated by reference to the following Detailed Description and claims in view of the accompanying figures of the drawing.

BRIEF DESCRIPTION OF THE VIEWS OF THE DRAWING

The present technology may be more completely understood and appreciated in consideration of the following detailed description of various embodiments in connection with the accompanying views of the drawing.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION

In the following detailed description of illustrative embodiments, reference is made to the accompanying figures of the drawing which form a part hereof. It is to be understood that other embodiments, which may not be described and/or illustrated herein, are certainly contemplated.

All headings provided herein are for the convenience of the reader and should not be used to limit the meaning of any text that follows the heading, unless so specified. Moreover, unless otherwise indicated, all numbers expressing quantities, and all terms expressing direction/orientation (e.g., vertical, horizontal, parallel, perpendicular, etc.) in the specification and claims are to be understood as being modified in all instances by the term "about." The term "and/or" (if used) means one or all of the listed elements or a combination of any two or more of the listed elements. The term "i.e." is used as an abbreviation for the Latin phrase id est and means "that is." The term "e.g." is used as an abbreviation for the Latin phrase exempli gratia and means "for example."

Figure 1:
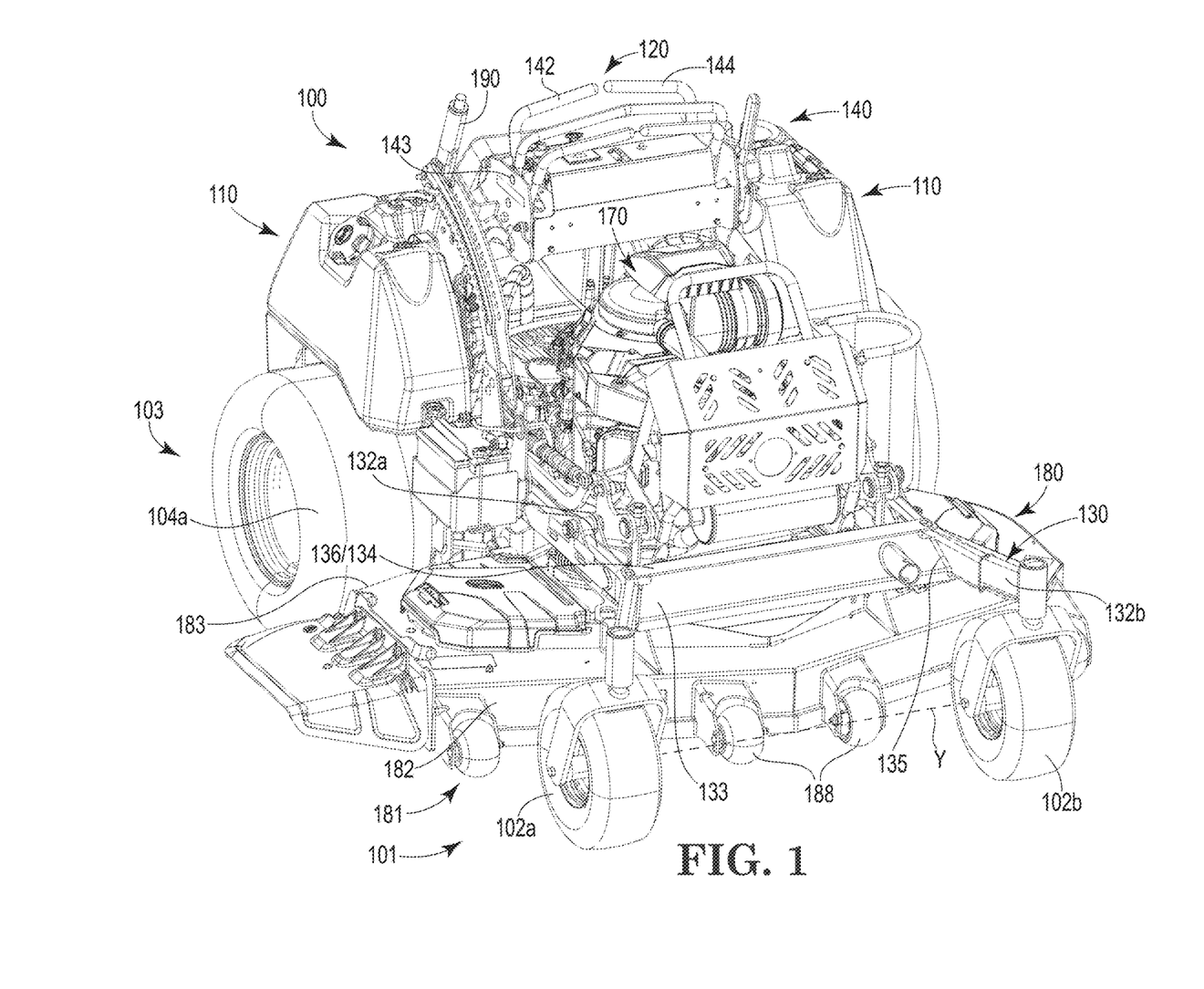
FIG. 1 is a front perspective view of an illustrative utility vehicle in accordance with one embodiment of this disclosure.

It is noted that the terms "have," "include," "comprise," and variations thereof, do not have a limiting meaning, and are used in their open-ended sense to generally mean "including, but not limited to," where the terms appear in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective shown in the particular figure, or while the vehicle 100 is in an operating configuration (e.g., while the vehicle 100 is positioned such that wheels 102 and 104 rest upon a generally horizontal ground surface as shown in FIG. 1). These terms are used only to simplify the description, however, and not to limit the interpretation of any embodiment described.

Still further, the suffixes "a" and "b" are used throughout this description to denote various right- and left-side parts/features, respectively. However, in most pertinent respects, the parts/features denoted with "a" and "b" suffixes are substantially identical to, or mirror images of, one another. It is understood that, unless otherwise noted, the description of an individual part/feature (e.g., part/feature identified with an "a" suffix) also applies to the opposing part/feature (e.g., part/feature identified with a "b" suffix). Similarly, the description of a part/feature identified with no suffix may apply, unless noted otherwise, to both the corresponding left and right part/feature.

Figure 2:
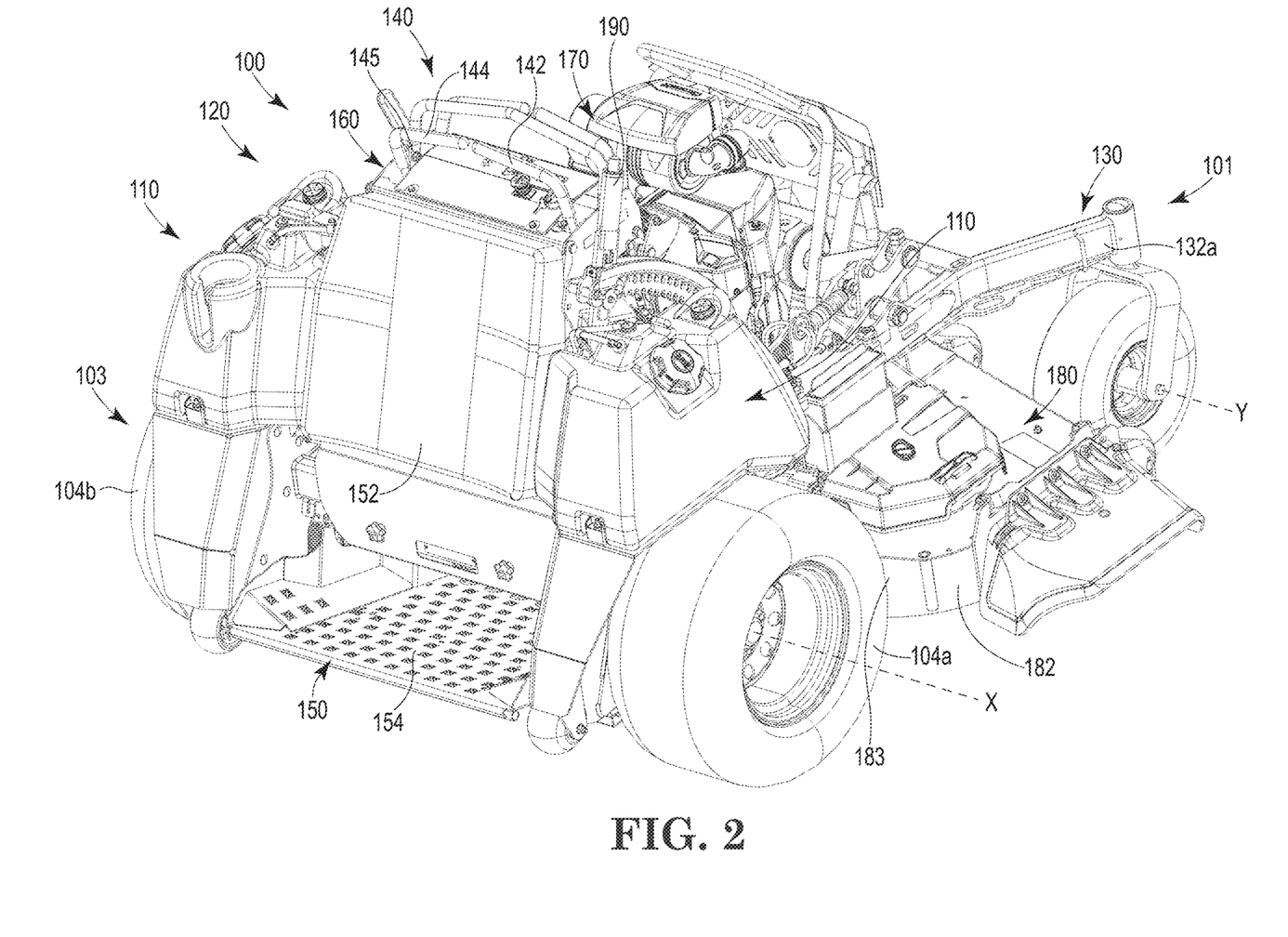
FIG. 2 is a rear perspective view of the utility vehicle of FIG. 1.

With reference to the figures, where like reference numerals designate like parts and assemblies throughout the several views, FIG. 1 illustrates a perspective view (e.g., a front perspective view) of an example grounds maintenance vehicle 100 (e.g., a utility vehicle) in accordance with the present disclosure, which can simply be referred to as a "vehicle." FIG. 2 illustrates a second perspective view (e.g., a rear perspective view) of the vehicle 100 of FIG. 1. The vehicle 100, in the current example, is a stand-on lawn mower. While embodiments are described herein with respect to such a mower, this disclosure is equally applicable to mowers having alternate configurations (e.g., walk-behind mowers and riding mowers). The embodiments also apply to other types of grounds maintenance vehicles (e.g., aerators, dethatchers, debris management systems, blowers, vacuums, sweepers, loaders, sprayer spreaders, ground treatment vehicles, general purpose utility vehicles, etc.) without limitation.

The vehicle 100 generally has a frame 130 (of which a portion is visible) or chassis that is configured to support various vehicle components. The frame 130 has a first end 101, which can be a front end, and a second end 103, which can be a rear end. The frame 130 has a plurality of load bearing members such as a siderail 132, which can include a first siderail 132a and second siderail 132b. A "siderail" is defined as a structural, load-bearing component of the vehicle frame 130. A siderail is generally an elongate beam. In one or more embodiments, siderails may be constructed of fabricated sheet metal such as press-formed or roll-formed sheet metal. Siderails may be formed from extruded metal or cast metal in other examples. In one or more embodiments, siderails may each be a hollow beam such as structural tubing or a pipe. In some other embodiments, the siderails are each a solid beam. In one or more embodiments, the siderail may define at least one channel extending along the length of the siderail such as, e.g., an I-beam, H-beam, T-beam, U-beam, or beams having alternate shapes.

The first siderail 132a and the second siderail 132b may generally extend longitudinally between the first end 101 and the second end 103 of the frame 130. The first siderail 132a and the second siderail 132b are generally spaced apart in a lateral or transverse direction, which is the width direction of the vehicle 100. In various embodiments, most of the respective lengths of the first siderail 132a and the second siderail 132b are parallel, but in other embodiments the first siderail 132a and the second siderail 132b are non-parallel. The frame 130 has one or more crossbeams 136 that are each fixed to the first siderail 132a and the second siderail 132b. For example, a first crossbeam 134 extends in the lateral direction across the first end 101 of the vehicle 100, which has a first end 133 fixed to the first siderail 132a and a second end 135 fixed to the second siderail 132b. Additional crossbeams can also be coupled to the first siderail 132a and the second siderail 132b, although such crossbeams are not currently shown in the illustrations.

The frame 130 is generally configured to be propelled across the ground surface. In particular, ground engaging members 104 and 102 are rotatably coupled to the vehicle frame 130. Here the ground engaging members are drive wheels 104 and one or more caster wheels 102, but in some embodiments the ground engaging members may be tracks, rollers, and/or other types of wheels. The one or more caster wheels 102 may be rotatably coupled to the vehicle frame 130 towards the first end 101 of the vehicle frame 130. The one or more caster wheels 102 are generally undriven wheels that are configured to accommodate directional motion of the vehicle 100 initiated and directed by the drive wheels 104. The one or more caster wheels 102 are generally freely swivelable about a vertical swivel axis relative to the vehicle frame 130. Each caster wheel 102 has a caster wheel axis Y, which the particular caster wheel 102 rotates around when the caster wheel is oriented in the longitudinal direction, which is in a forward orientation. In some embodiments, including the specific example depicted, the caster wheels 102 mutually define the caster wheel axis Y, such that the caster wheel axis Y is a shared axis that the caster wheels 102 rotate around when oriented in the longitudinal direction. It is possible that, in some embodiments, the caster wheels 102 have separate caster wheel axes when the caster wheels 102 are oriented in the longitudinal direction. In such embodiments, the separate caster wheel axes may be parallel.

The drive wheels 104 may be rotatably coupled to the vehicle frame 130 towards the second end 103 of the vehicle frame 130. The drive wheels 104 are generally configured to propel the vehicle 100 over the ground surface and control the vehicle's direction. The drive wheels 104 are generally in mechanical communication with a prime mover 170 (e.g., internal combustion engine or electric motor(s)) that is configured to selectively propel the drive wheels 104 to propel the vehicle 100 across the ground. A left and a right ground engaging drive wheel 104 may be rotatably coupled to left and right sides of a rear portion of the vehicle 100, respectively. The drive wheels 104 may be independently powered by the prime mover 170 (e.g., via one or more hydraulic motors, transmissions, or the equivalent) so that they may be driven independently of one another. This permits spin or skid type turning in a zero radius turn manner by rotating one drive wheel 104 in a forward direction while simultaneously rotating the other drive wheel 104 in a reverse direction.

The drive wheels 104 are rotatable about a drive wheel axis X that extends in the lateral direction (e.g., as shown in FIG. 2). In some embodiments, the drive wheel axis X is parallel to the caster wheel axis Y (when the vehicle 100 is travelling in a straight line). Although the illustrated vehicle 100 has the drive wheels 104 in the rear, this configuration is not limiting. For example, other embodiments may reverse the location of the wheels, e.g., drive wheels in front and the caster wheel(s) in back. Moreover, other configurations may use different wheel configurations altogether, e.g., a tri-wheel configuration or a conventional front-wheel-steering configuration. Accordingly, other embodiments are possible without departing from the scope of the disclosure.

The prime mover 170 is coupled to the vehicle frame 130. The prime mover 170 is generally configured to drive the drive wheels 104, as described herein. As previously described, the prime mover 170 may be an internal combustion engine in some embodiments and in some other embodiments the prime mover 170 may be one or more electric motors. For example, in one or more embodiments, the prime mover 170 may have a driveshaft (not shown) that is vertically oriented (i.e., a "vertical driveshaft") and is generally in mechanical communication with the drive wheels 104 through a hydraulic transmission system.

The prime mover 170 is generally configured to be controlled by a user or operator through a control panel 140, for example. The control panel 140 is in operative communication with the prime mover 170. The control panel 140 may have one or more handles 142, 144 that are configured to selectively propel and direct vehicle propulsion. In one or more embodiments, a first handle 142 and a second handle 144 extend outward from the vehicle frame 130 and are each configured to be manually translated relative to the vehicle frame 130 to control operation of the vehicle 100. In the example depicted, the first handle 142 and the second handle 144 are each manually pivotable about a pivot. The first handle 142 has a first pivot 143 (e.g., as shown in FIG. 1) and the second handle 144 has a second pivot 145 (e.g., as shown in FIG. 2). The first handle 142 and the second handle 144 are manually translated about their respective pivots 143, 145 to control operation of the vehicle 100.

In one or more embodiments, the first handle 142 and second handle 144 may be considered a twin lever control panel, where translation of each handle 142, 144 controls the speed and rotational direction of a corresponding drive wheel 104a, 104b. In this example, translation of the first handle 142 controls a first drive wheel 104a and translation of the second handle 144 controls a second drive wheel 104b. A drive wheel is considered to "correspond" to a particular handle when it is located on the same side of the vehicle, such that, e.g., a drive wheel on the right side of the vehicle corresponds to a handle on the right side of the vehicle and a drive wheel on the left side of the vehicle corresponds to a handle on the left side of the vehicle.

The vehicle 100 may also have handles with other configurations. In one or more embodiments, a handle can be configured as a steering wheel. The vehicle 100 may have various alternative and additional controls that may be used by the operator to manipulate functions of the vehicle 100. The one or more handles 142, 144 and/or various other controls of the control panel 140 are configured to be accessible to the operator positioned to control the vehicle 100.

Specifically, the controls of the control panel 140 may be mounted to an upwardly extending portion of the frame 130 referred to herein as a control tower 120. The control tower 120 may be located at or near the second end 103 (e.g., the rear end) of the vehicle 100. Situated near the top of the control tower 120 is a control area that positions the control panel 140 within comfortable reach of an operator who may be standing either behind the vehicle 100 or upon a platform (e.g., as described herein).

In the current example, the vehicle 100 is configured as a stand-on vehicle. As such, an operator platform 150 (e.g., as shown in FIG. 2) is coupled to the vehicle frame 130. The operator platform 150 is one or more surface(s) adapted to support the feet of a standing operator (e.g., behind the vehicle 100). In other words, the standing platform may allow the operator to move along with the vehicle 100. The operator platform 150 is coupled to the vehicle frame 130 towards the second end 103 (e.g., extending rearward from the frame 130) and aft of the control tower 120.

In one or more embodiments, the operator platform 150 is pivotably mounted on the vehicle 100. In such embodiments the operator platform 150 has a deployed position where a platform surface 154 (e.g., as shown in FIG. 2) extends longitudinally outwardly from the vehicle to receive a standing operator. In some embodiments, the operator platform 150 can also have a stored or stowed position that is distinct from the deployed position where the platform surface 154 is pivoted upward or downward in a position that is not configured to receive a standing operator. Further, in one or more embodiments, the vehicle 100 may include a support pad 152 coupled to the vehicle 100 (e.g., the control tower 120) and may be configured to contact or support the body (e.g., a leg or thigh) of a standing operator positioned on the operator platform 150 (e.g., an operator leaning against the support pad 152). The support pad 152 may act as a dampener (e.g., from vibrations and/or jolting) and a comfortable rest for the legs of the operator.

In alternative embodiments, the vehicle can be a riding vehicle or a walk-behind vehicle. In some other embodiments, the vehicle has a seat to accommodate a seated operator instead of a standing operator. In embodiments where the vehicle has a seat instead of a standing platform, the one or more handles 142, 144 and other system controls are configured to be accessible to the seated operator. In such embodiments, the support pad 152 may still be utilized by the operator to stabilize the operator relative to the vehicle 100.

Additionally, the vehicle 100 may include one or more tanks 110 positioned lateral to the control tower 120. Such one or more tanks 110 may be used to carry a source of fuel for the prime mover as understood by those of skill in the art. While embodiments are described herein as a fuel storage tank, those of skill in the art will recognize that embodiments of the present disclosure may find application to any tank 110 positioned lateral to one or both sides of the control tower 120 without departing from the scope of the present disclosure. For example, in one or more embodiments, the one or more tanks 110 may be used for other storage purposes via an interior volume (e.g., fertilizer, water, physical components, etc.) or non-storage purposes (e.g., for operator comfort as described herein).

Figure 3:
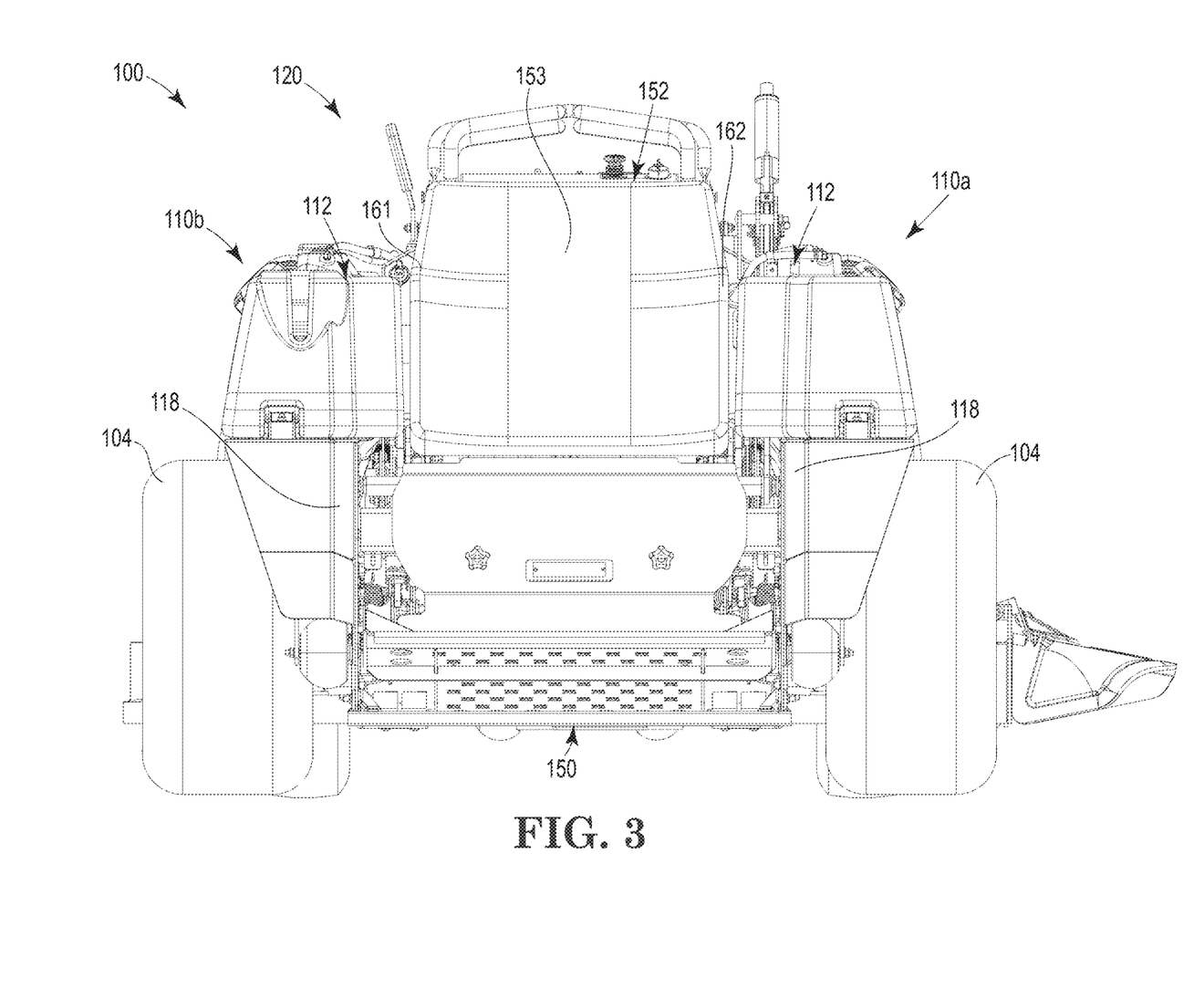
FIG. 3 is a rear view of the utility vehicle of FIG. 1.
Figure 4:
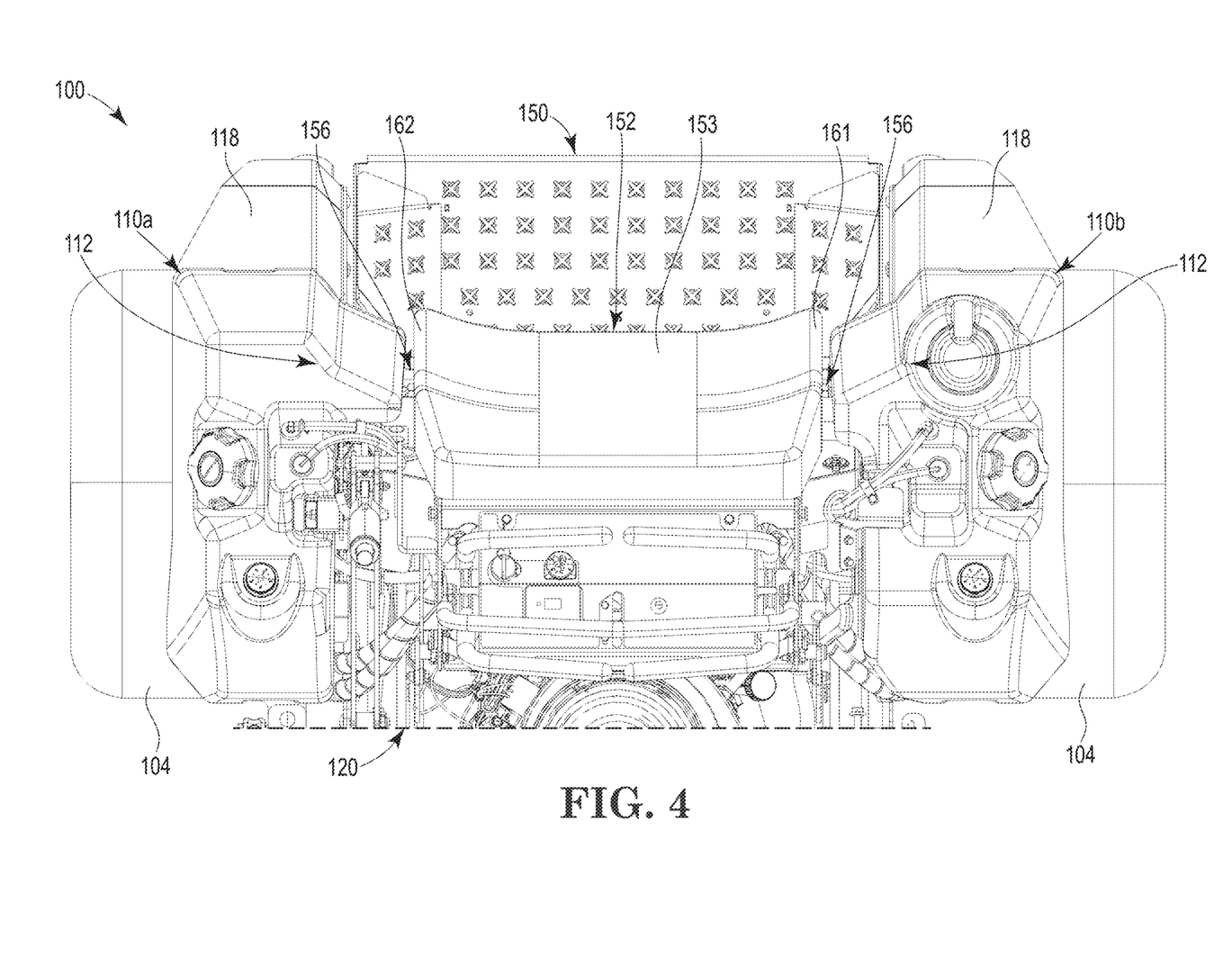
FIG. 4 is a top view of a portion of the utility vehicle of FIG. 1.

For example, as shown in FIGS. 3 and 4, the vehicle may include a tank 110 on either side of the support pad 152. Specifically, the vehicle 100 may include a right side tank 110a positioned to the right of the control tower 120 and a left side tank 110b positioned to the left of the control tower 120. While the vehicle 100 is illustrated with a dual tank system, embodiments of the present disclosure are equally applicable to single tank configurations. Further, the one or more tanks 110 will be described generically herein as a single tank, with the understanding that another similar tank may be included on the opposite lateral side of the control tower 120.

The tank 110 may be attached to the frame 130 and, in one or more embodiments, positioned at least partially over and/or adjacent to one of the drive wheels 104. In one or more examples, the tank 110 (e.g., an interior volume thereof) may be in fluid communication with the prime mover 170 (e.g., an internal combustion engine) to provide fuel to the prime mover 170. A cap may cover an access port (e.g., port to the interior volume) when secured to the tank 110, effectively sealing the access port. The cap may be removed as needed to permit fuel to be poured through the access port and into the interior volume. While shown as a fuel cap, other tanks 110 may utilize a "capless" design or not include a cap without departing from the scope of this disclosure. The tank 110 may be formed using any suitable process, e.g., injection molding, roto-molding, etc. Moreover, the tank 110 may be formed of (e.g., made of) most any suitable material such as, e.g., plastic, metal, composite, etc.

Figure 5:
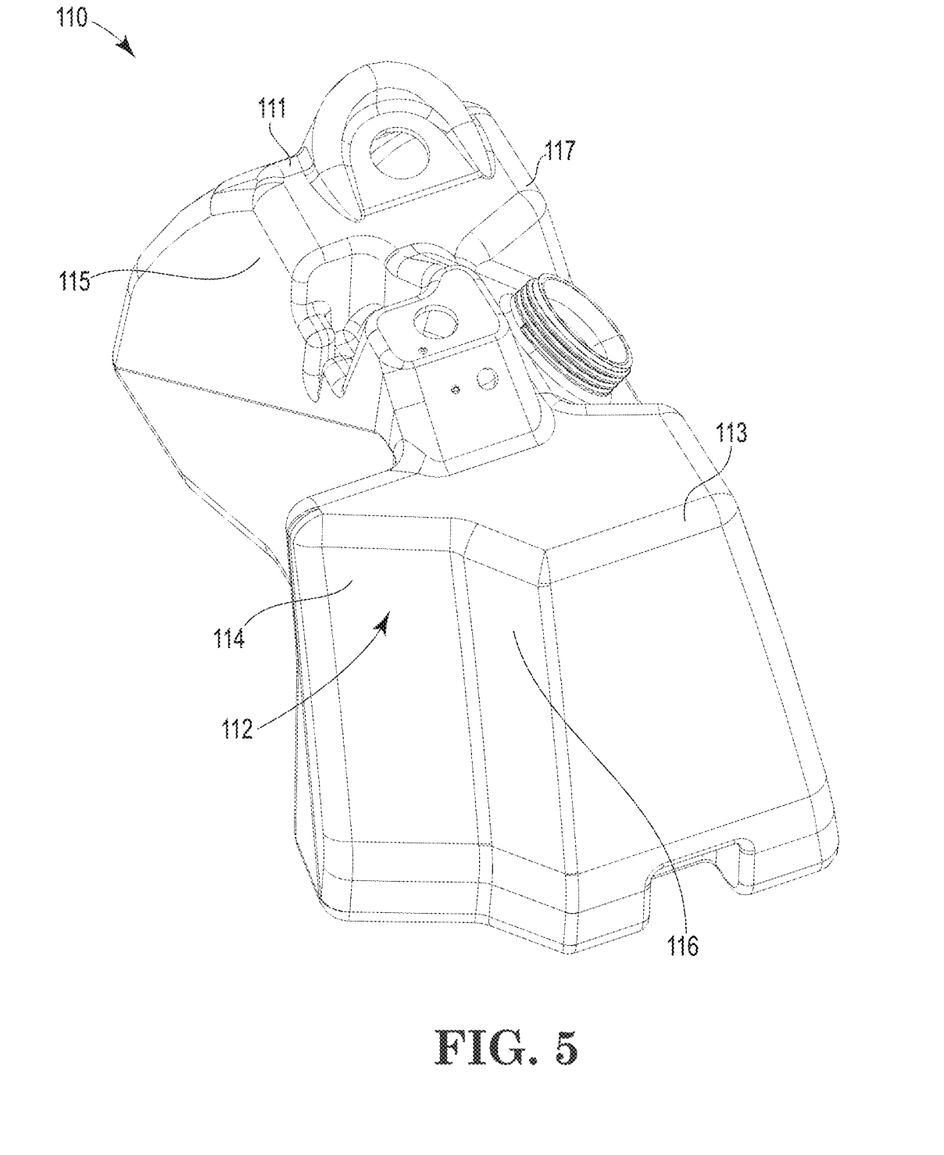
FIG. 5 is an isolated view of a tank of the utility vehicle of FIG. 1.

As shown in FIG. 5, the tank 110 may extend between a front end 111 and a rear end 113 along the longitudinal direction. Further, the tank 110 may define an inner surface 115 and an outer surface 117, each extending between the front and rear ends 111, 113. The inner surface 115 of the tank 110 may be positioned to face an operator standing on the operator platform 150, e.g., as shown in FIGS. 3 and 4. Additionally, the tank 110 may be positioned such that at least a portion of the tank 110 extends longitudinally past the support pad 152 to the rear end 113 of the tank 110. As such, with tanks 110 on either side of the control tower 120, portions of each tank 110 (e.g., proximate the rear end 113 thereof) and the support pad 152 create a pocket or partial enclosure within which the operator may be positioned when standing on the operator platform 150. As described herein, the tank 110 may act as an extension of the support pad 152 and an operator may lean against one or both of the support pad 152 and the tank 110 during operation of the vehicle 100.

Figure 6:
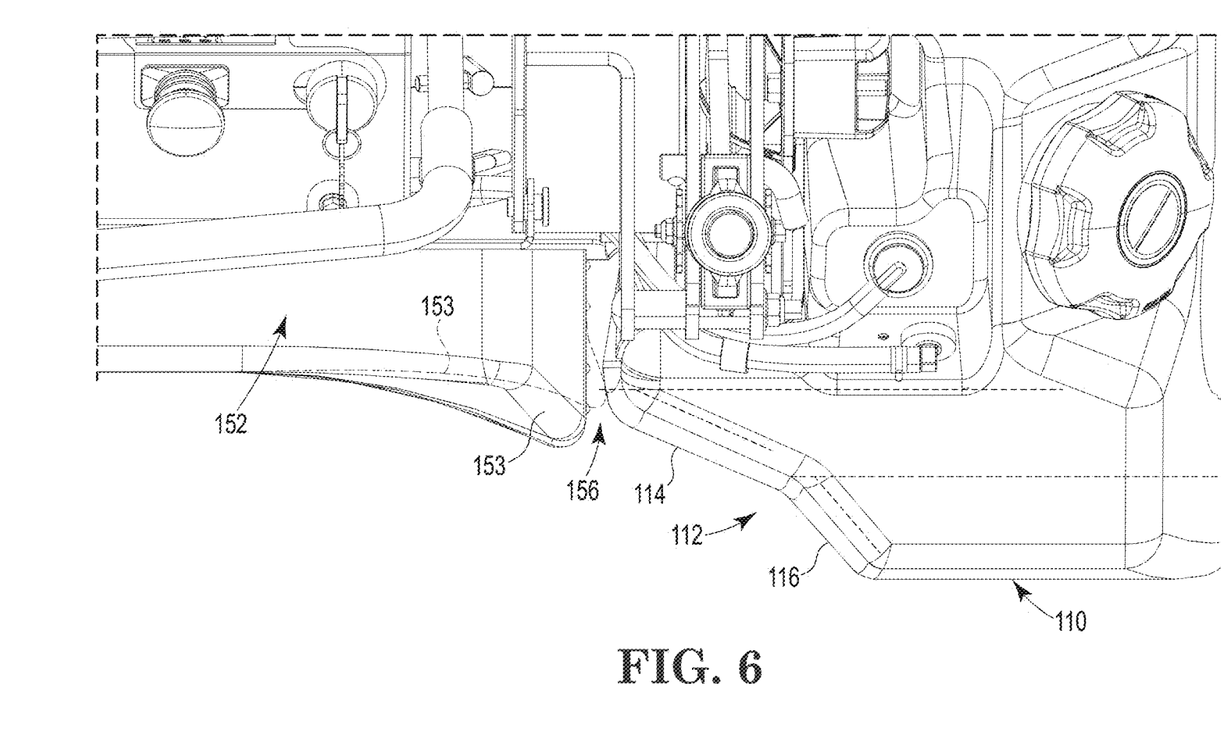
FIG. 6 is a perspective view of the utility vehicle of FIG. 1 illustrating a pad surface of a support pad aligned with an angled surface of a tank.

Furthermore, as shown in FIG. 5, the tank 110 may define an angled surface 112 on the inner surface 115 of the tank 110 proximate the rear end 113 of the tank 110. The angled surface 112 may be described as "angled" because the inner surface 115 of the tank 110 may not extend linearly between the front and rear ends 111, 113 but, instead, the inner surface 115 angles outward near the rear end 113 (e.g., starting from a point between the front and rear ends 111, 113). Further, in one or more embodiments, the angled surface 112 may include two or more portions (e.g., at different angles) that combine to form the continuous angled surface 112 (e.g., as described later herein). A portion of the angled surface 112 of the tank 110 may be configured to align with a pad surface 153 of the support pad 152, e.g., as shown in FIG. 6. For example, the angled surface 112 of the tank 110 may be positioned and oriented to form a smooth transition with the pad surface 153 of the support pad 152. Specifically, the operator may lean against and move between the angled surface 112 of the tank 110 and the pad surface 153 of the support pad 152 without a particularly noticeable transition therebetween. Additionally, in one or more embodiments, a top surface of the tank 110 may be between a top and bottom of the support pad 152 (e.g., above a midpoint thereof) to provide a side support to the operator around the thigh (e.g., as shown in FIG. 3).

The support pad 152 may extend between a left side 161 and a right side 162 along a generally transverse direction. The support pad 152 may define a thickness at the left and right sides 161, 162 that is greater than a thickness at a middle portion between the left and right sides 161, 162. These increases in support pad 152 thickness proximate the left and right sides 161, 162 may be described as a pad bolster to further support an operator leaning into the support pad 152. Further, the pad bolster on the left and right sides 161, 162 may be contoured (e.g., shaped) such that each side may align with the angled surface 112 of the tank 110.

The angled surface 112 of the tank 110 and the pad surface 153 of the support pad 152 may be aligned as defined in a variety of different ways. Specifically, the alignment may be based on the interface or interaction between portions of the angled surface 112 and the pad surface 153 that are most proximate to one another (e.g., an edge of the angled surface 112 and an edge of the pad surface 153). Therefore, in one or more embodiments, either of the pad surface 153 or angled surface 112 may be curved or angled from the edge while the edges are still considered aligned.

In one or more embodiments, the pad surface 153 of the support pad 152 and the angled surface 112 of the tank 110 are coplanar (e.g., relatively even) and aligned at a region in which the pad surface 153 and the angled surface 112 are most proximate one another. In other words, a plane defined by the pad surface 153 near the edge of the pad surface 153 may be the same as a plane defined by the angled surface 112 near the edge of the angled surface 112.

In one or more embodiments, the planes defined by the pad surface 153 and the angled surface 112 may be parallel to one another and offset. For example, the planes defined by the pad surface 153 and the angled surface 112 may be offset in either direction (e.g., forward or backward) by less than or equal to 1.5 inches, less than or equal to 1 inch, less than or equal to 0.5 inches, etc. and/or greater than or equal to 0.25 inches, greater than or equal to 0.6 inches, greater than or equal to 0.85 inches, etc. to define the alignment therebetween. Specifically, the plane defined by the pad surface 153 may be forwardly or rearwardly offset (e.g., by less than or equal to 1 inch) from the plane defined by the angled surface 112 and still aligned. Additionally, or alternatively, the planes defined by the pad surface 153 and the angled surface 112 may be angled relative to one another in either direction by less than or equal to 10 degrees to define the alignment therebetween. For example, in one or more embodiments, the support pad 152 and the angled surface 112 are aligned when the planes defined by the pad surface 153 and the angled surface 112 are the same (e.g., the offset is 0 inches and the angle therebetween is 0 degrees). Also, for example, in one or more embodiments, the support pad 152 and the angled surface 112 are aligned when the planes defined by the pad surface 153 and the angled surface 112 have an offset and/or angle therebetween that is non-zero (e.g., offset less than 0.5 inches and/or angle less than 10 degrees). Each of these alignment configurations may create a continuous smooth transition between the angled surface 112 and the pad surface 153.

The angled surface 112 of the tank 110 may also be defined in relation to a transverse direction of the vehicle 100 (e.g., laterally perpendicular to the longitudinal direction of the vehicle 100). For example, in one or more embodiments, the angled surface 112 of the tank 110 may define an angle of less than or equal to about 30 degrees relative to the transverse direction. It is noted that this angle of the angled surface 112 may be defined as the initial angle of the angled portion (e.g., a portion of the angled surface 112 that is most proximate the support pad 152) because, e.g., in one or more embodiments, the angled surface 112 may define a curved surface and not necessarily a planar surface throughout.

In one or more embodiments, the angled surface 112 of the tank 110 may include any number of differently angled portions that form a continuous surface of the angled surface 112. For example, the angled surface 112 may define a first portion 114 proximate the support pad 152 and a second portion 116 extending from the first portion 114 (e.g., extending rearward and outward therefrom). In other words, the inner surface 115 of the tank 110 may include two distinct angles extending outward near the rear end 113 of the tank 110. Further, the first portion 114 of the angled surface 112 may be about 30 degrees relative to the transverse direction and the second portion 116 of the angled surface 112 may extend outwardly at an angle of about 45 degrees relative to the transverse direction. This progressive angled surface 112 of the tank 110 may be defined to form a continuous surface with the pad surface 153 and form a semi-enclosed pocket within which an operator may stand. Additionally, in one or more embodiments, the vehicle 100 may include a rear fender 118 that is shaped to correspond to the angles defined by the angled surface 112 (e.g., to create a continuous surface downward from the angled surface 112).

As described previously herein, the vehicle 100 may include an operator platform 150 configured to support an operator and position the operator to access the controls. The operator platform 150 may be connected to the frame 130 and extend rearward from the control tower 120. Further, at least a portion of the tank 110 may be positioned lateral to the operator platform 150. Specifically, at least a portion of the angled surface 112 of the tank 110 may be positioned lateral to the operator platform 150. In other words, an operator standing on the operator platform 150 may lean to the side and interact with the angled surface 112 of the tank 110. Furthermore, because the angled surface 112 and the rear fender 118 may be aligned, the operator standing on the operator platform 150 may lean to the side and interact with a smooth transition (e.g., between the angled surface 112 and the rear fender 118) that extends upward from the operator platform 150. In one or more embodiments, the smooth transition of the rear fender 118 and angled surface 112 extending upward from the operator platform 150 may be angled outward (e.g., from bottom to top) to correspond with the operator's natural tilt to the side when leaning.

In accordance with the description herein, the vehicle 100 may include a tank 110 on both sides of the control tower 120. For example, a right tank 110a may be positioned on the right side of the control tower 120 and a left tank 110b may be positioned on the left side of the control tower 120. The angled surface 112 of the tank 110 is described generally herein and may be applicable to both the right and left tanks 110a, 110b. In such embodiments including right and left tanks 110a, 110b, the pad surface 153 of the support pad 152 may be configured to align with a portion of the angled surface 112 of each of the left and right tanks 110a, 110b (e.g., as described previously herein). Therefore, the operator may shift between the right and left tanks 110a, 110b along the pad surface 153 of the support pad 152 with a smooth transition between all.

In one or more embodiments, the support pad 152 and the tank 110 (e.g., the right and/or left tank 110a, 110b) may be positioned such that there is a gap 156 therebetween (e.g., as shown in FIGS. 4 and 6). For example, the gap 156 between the support pad 152 and the tank 110 may define a distance of about less than or equal to 1 inch, less than or equal to 0.75 inches, less than or equal to 0.5 inches, etc. and/or greater than or equal to 0.1 inches, greater than or equal to 0.25 inches, greater than or equal to 0.6 inches, etc. measured along a transverse direction. Even with the gap 156, the support pad 152 and the tank 110 may be aligned to create a smooth transition therebetween. In other embodiments, there may be no gap or minimal gap between the support pad 152 and the tank 110. For example, the support pad 152 and the tank 110 may be in contact to form a continuous surface therebetween.

As shown in FIGS. 3 and 4, the operator platform 150 may extend laterally wider than the support pad 152. As such, the tank may typically be positioned laterally at the right or left edge of the operator platform 150. Therefore, to assist with alignment between the support pad 152 and the tank 110 (e.g., to bridge the distance between the narrower support pad 152 and the wider spaced tanks 110), at least a portion of the tank 110 may laterally overlap with the operator platform 150 along the transverse direction. In other words, a portion of the tank 110 may extend laterally inward over a side of the operator platform 150 to a position that is proximate the support pad 152.

Figure 7:
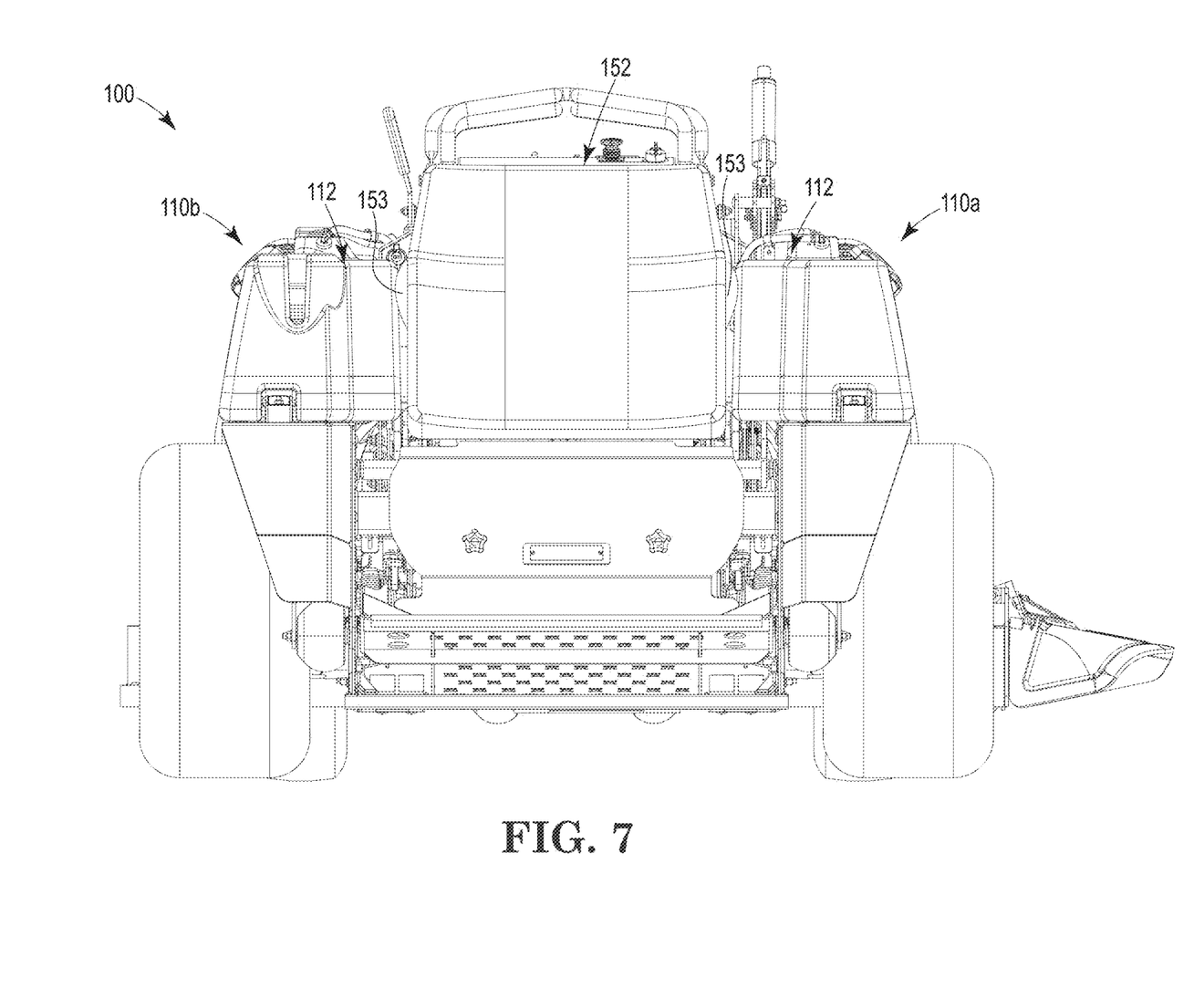
FIG. 7 is a rear view of the utility vehicle of FIG. 1 having a deformed operator support pad.
Figure 8:
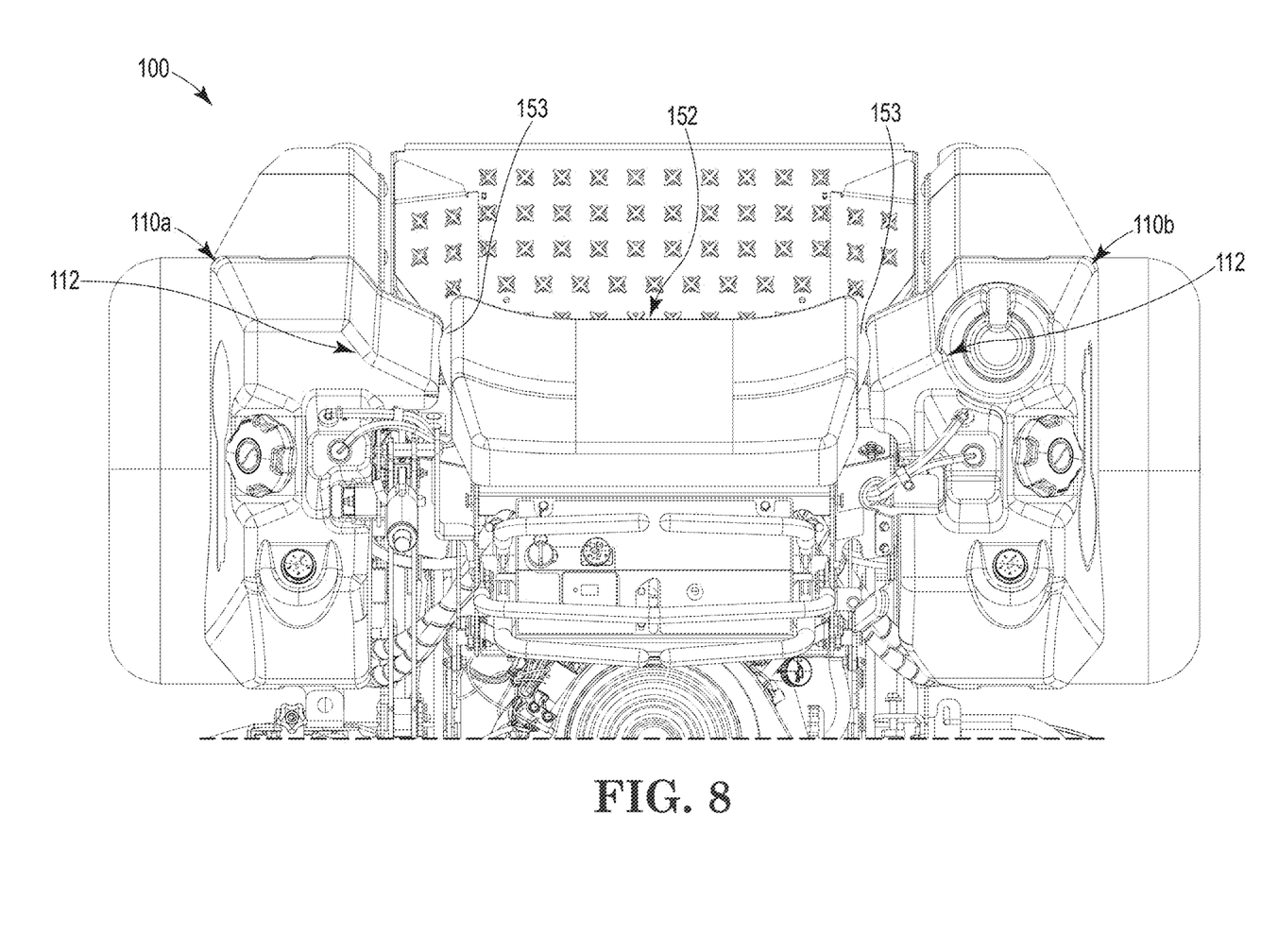
FIG. 8 is a top view of a portion of the utility vehicle of FIG. 7.

As shown in FIGS. 6, 7 and 8, at least a portion of the support pad 152 may be configured to be deformable (e.g., compressible, deflectable, etc.) when a pressure is applied thereto. For example, the support pad 152 may deform in a specific region of the support pad 152 when a pressure is applied to that region (e.g., when an operator applies a pressure or force by leaning against the support pad 152). The support pad 152 may include (e.g., be formed of) any suitable deformable material such as, e.g., foam, rubber, etc. Furthermore, when a portion of the support pad 152 that is most proximate the angled surface 112 of the tank 110 is deformed (as shown by broken line representation of pad surface 153 in FIG. 6), the deformed pad surface 153 of the support pad 152 and the angled surface 112 of the tank 110 may align (e.g., aligned as described herein). In other words, deformation of the support pad 152 may move the pad surface 153 such that it aligns with the angled surface 112 of the tank 110. Therefore, the operator may experience a smooth transition (e.g., a continuous surface) when leaning against the support pad 152 and the angled surface 112.

Accordingly, in one or more embodiments, the support pad 152 may be positioned and/or oriented differently relative to the angled surface 112 such that alignment between the support pad 152 and the angled surface 112 occurs under deformation. For example, the support pad 152 may be initially positioned relatively even (e.g., flush) with the angled surface 112 because the support pad 152 deforms minimally. Further, the support pad 152 may be initially positioned to extend rearward of the angled surface 112 because the support pad 152 has a higher deflection under deformation (e.g., the deformation may push the support pad 152 forward). In other embodiments, the support pad 152 may align with the angled surface 112 prior to any deformation of the support pad 152.

Additionally, in one or more embodiments, the support pad 152 may contact the tank 110 when the support pad 152 is deformed. For example, deformation of the support pad 152 may push a portion of the support pad 152 towards the angled surface 112 of the tank 110 and close any gap defined therebetween. In such embodiments, the support pad 152 may deform such that the pad surface 153 of the support pad 152 forms a continuous surface with the angled surface 112 of the tank 110.

Figure 9:
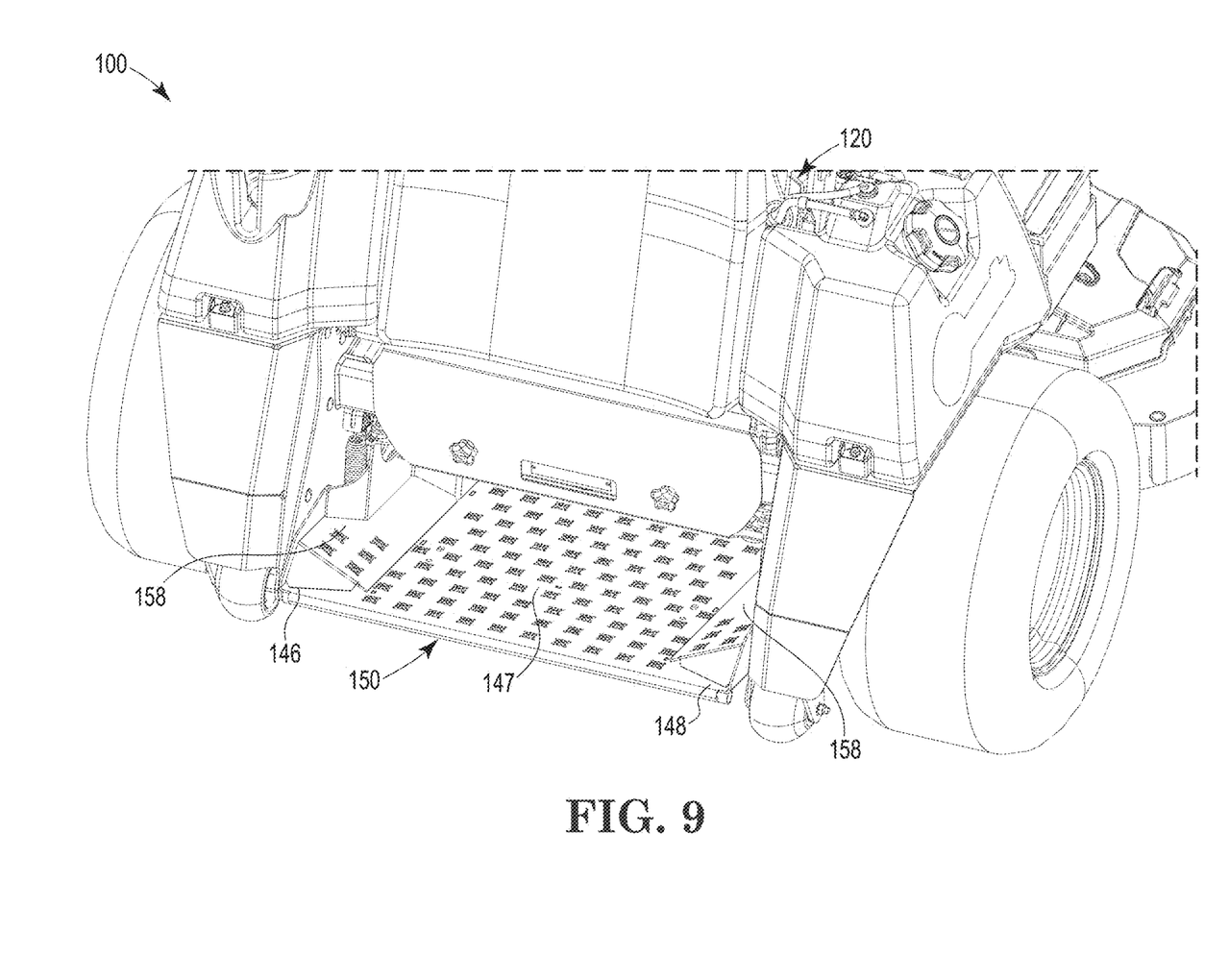
FIG. 9 is an expanded rear perspective view of an operator platform of the utility vehicle of FIG. 1.
Figure 10:
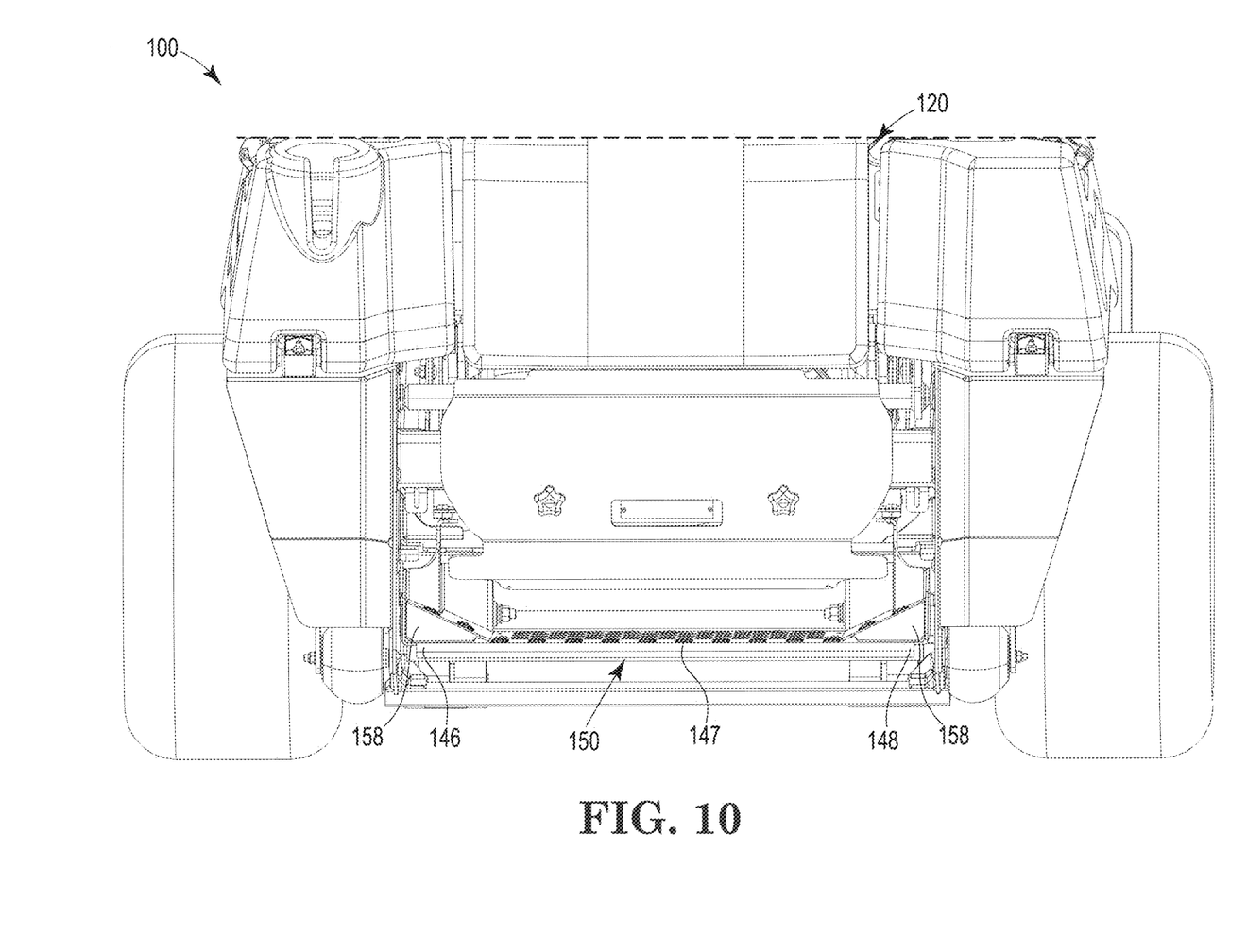
FIG. 10 is a rear view of the operator platform of FIG. 9.

FIGS. 9 and 10 illustrate the operator platform 150 connected to the frame 130 and extending rearward from the control tower 120. The operator platform 150 may extend between a left platform side 146 and a right platform side 148 along the transverse direction. Further, a majority of the operator platform 150 (e.g., a center portion 147) may extend generally along a platform plane (e.g., as shown in FIG. 10). In one or more embodiments, the operator platform 150 may include an angled platform portion 158 located proximate at least one of the left and right platform sides 146, 148. Specifically, the angled platform portion 158 may be angled relative to the platform plane such that a surface of the angled platform portion 158 extends away from the platform plane in a direction towards the at least one of the left and right platform sides 146, 148 (e.g., away from the center portion 147). As shown in FIGS. 9 and 10, the operator platform 150 includes an angled platform portion 158 proximate both the left and right platform sides 146, 148.

The angled platform portions 158 may be used by the operator to assist in operator stabilization on ground surface slopes and during turns. For example, when the vehicle 100 is traversing along the side of a sloped ground surface (e.g., side hill traversal), the operator may position at least one foot on the opposing angled platform portion 158 (e.g., opposite the uphill side). The angled platform portion 158 on the downhill side may be oriented in a more level position (e.g., compared to the remainder of the operator support) and provide the operator with comfortable footing. Further, the operator may also provide counterweight by leaning uphill onto the tank on the uphill side during the side hill traversal while utilizing the downhill side angled platform portion 158.

The angled platform portion 158 may define any suitable dimensions. For example, the angled platform portion 158 may be sized to comfortably fit the entire bottom of a foot of the operator (e.g., so that the operator may step on a constant, continuous surface of the angled platform portion 158). Specifically, the angled platform portion 158 may define a width (e.g., as measured along the plane of the angled platform portion 158) that is about 2 inches wider than a foot width of the operator (e.g., about less than or equal to 8 inches). Further, the center portion 147 of the operator platform 150 (e.g., positioned between the angled platform portions 158) may define a width suitable for an operator to stand on a continuous surface while operating the vehicle 100. For example, in one or more embodiments, the center portion 147 may define a width that is similar (e.g., within about 2 inches on either side) to the width of the support pad 152 (e.g., such that an operator standing on the center portion 147 may utilize the support pad 152). In one or more embodiments, the angled platform portion 158 may be angled relative to the platform plane by about 10 degrees to 45 degrees. Also, in one or more embodiments, the angled platform portion 158 may define a width of about 5 inches measured along the transverse direction and a height of about 2.5 inches measured from the platform plane at the at least one of the left and right platform sides.

Furthermore, referring back to FIG. 1, an implement assembly 180 is generally configured to couple to, or be integrally formed with, the vehicle 100. The implement assembly 180 is generally configured to perform a maintenance task on a surface, such as the ground surface. The implement assembly 180 has a first implement end 181 and a second implement end 183 and is generally configured for operational interaction with the ground surface. In this example, the first implement end 181 is the front end of the implement assembly 180 and the second implement end 183 is the back end of the implement assembly 180. In the current example, the implement assembly 180 is configured to be disposed between at least a portion of the vehicle frame 130 and the ground surface.

In the current example, where the vehicle 100 includes a lawn mower assembly, the implement assembly 180 is a cutting deck having a housing 182 defining a cutting chamber. Cutting blades are rotatably disposed in the cutting chamber. As stated above, most any cutting deck configuration (e.g., belly-mounted decks, towed decks, reel units, etc.), as well as other implements, are contemplated within the scope of this disclosure. During operation, power may be selectively delivered to the cutting chamber by the prime mover 170, whereby the cutting blades rotate at a speed sufficient to sever grass and other vegetation over which the deck passes. In other embodiments, the implement assembly may include a variety of different tool attachments such as, e.g., a bucket, forks, a vibratory plow, a grapple rake, a trencher, a leveler, a box rake, a soil cultivator, a snow-thrower, a stump grinder, a tiller, an auger, a plow blade, a backhoe, a cement bowl, a leveler, a material or debris hauler, etc. Further, the tool attachments may be positioned relative to the frame 130 of the vehicle 100 in any suitable way.

The implement assembly 180 may also have a plurality of rollers 188 (e.g., anti-scalp rollers) configured to be disposed between the implement assembly 180 and a ground surface to limit contact between the implement assembly 180 and the ground surface. The plurality of rollers 188 may be configured to obstruct contact between the implement assembly 180 and the ground surface to reduce scalping of the ground surface as the implement assembly 180 translates across the ground surface.

A pre-selected operating height is generally defined between the implement assembly 180 and the ground surface for a specific height-of-cut setting. The operating height may be selected by a user through a height selection tool 190. The height selection tool 190 is configured to change a default vertical operating position of the implement assembly 180 relative to the vehicle frame 130, which changes the pre-selected operating height.

It should also be noted that, as used in this specification and the appended claims, the phrase "configured" describes a system, apparatus, or other structure that is constructed to perform a particular task or adopt a particular configuration. The word "configured" can be used interchangeably with similar words such as "arranged," "constructed," "manufactured," and the like.

All publications and patent applications in this specification are indicative of the level of ordinary skill in the art to which this technology pertains. All publications and patent applications are herein incorporated by reference to the same extent as if each individual publication or patent application were specifically and individually indicated by reference. In the event that any inconsistency exists between the disclosure of the present application and the disclosure(s) of any document incorporated herein by reference, the disclosure of the present application shall govern.

This application is intended to cover adaptations or variations of the present subject matter. It is to be understood that the above description is intended to be illustrative, and not restrictive, and the claims are not limited to the illustrative embodiments as set forth herein.

What is claimed is:

1. A utility vehicle comprising:
   a frame carrying a prime mover and extending between a first end and a second end in a longitudinal direction;
   ground engaging members operatively attached to the frame, wherein at least one of the ground engaging members is powered by the prime mover to propel the frame over a ground surface;
   a control tower located at or near a rear end of the frame, the control tower carrying controls configured to be manipulated by an operator;
   a tank positioned lateral to the control tower, wherein the tank defines an angled surface; and
   a support pad connected to the control tower and configured to contact a leg of the operator, wherein a pad surface of the support pad is configured to align with a portion of the angled surface of the tank.

2. The utility vehicle of claim 1, wherein the pad surface of the support pad and the portion of the angled surface of the tank are aligned such that a plane defined by each are within 1 inch of one another.

3. The utility vehicle of claim 1, wherein the pad surface of the support pad and the angled surface of the tank are coplanar at a region in which the pad surface and the angled surface are most proximate one another.

4. The utility vehicle of claim 1, wherein the support pad extends between a left side and a right side along a generally transverse direction, wherein the support pad defines a thickness at the left and right sides that is greater than a thickness at a middle portion between the left and right sides.

5. The utility vehicle of claim 1, wherein the at least a portion of the support pad is configured to be deformable when a pressure is applied thereto, and wherein a pad surface of the support pad is aligned with the portion of the angled surface when the support pad is deformed.

6. The utility vehicle of claim 1, wherein a gap is defined between the support pad and the tank.

7. The utility vehicle of claim 6, wherein the gap defines a distance of 0.5 inches measured along a transverse direction.

8. The utility vehicle of claim 1, wherein the tank is positioned on a left side of the control tower, wherein the utility vehicle further comprises an additional tank positioned lateral to a right side of the control tower, and wherein the pad surface is configured to align with a portion of an angled surface of the additional tank.

9. The utility vehicle of claim 1, wherein the support pad is configurable to be deformed, wherein the pad surface of the support pad is located rearward of the angled surface of the tank at a region in which the pad surface and the angled surface are most proximate one another.

10. The utility vehicle of claim 1, wherein the angled surface of the tank defines an angle of less than or equal to about 30 degrees relative to a transverse direction at a portion of the angled surface that is most proximate the support pad.

11. The utility vehicle of claim 1, wherein the angled surface of the tank defines a first portion proximate the support pad and a second portion extending from the first portion, wherein the first portion of the angled surface extends outwardly at an angle of about 30 degrees relative to a transverse direction and the second portion of the angled surface extends outwardly at an angle of about 45 degrees relative to the transverse direction.

12. The utility vehicle of claim 1, further comprising an operator platform connected to the frame and extending rearward from the control tower, wherein the angled surface of the tank is lateral to the operator platform.

13. The utility vehicle of claim 1, further comprising an operator platform connected to the frame and extending rearward from the control tower, wherein the operator platform extends between a left platform side and a right platform side along a transverse direction, wherein at least one of the left and right platform sides is laterally overlapping with at least a portion of the tank along the transverse direction.

14. The utility vehicle of claim 1, further comprising an operator platform connected to the frame and extending rearward from the control tower, wherein the operator platform extends between a left platform side and a right platform side along a transverse direction, wherein the operator platform extends along a platform plane, wherein the operator platform comprises an angled platform portion located proximate at least one of the left and right platform sides, wherein the angled platform portion is angled relative to the platform plane such that a surface of the angled platform portion extends away from the platform plane in a direction towards the at least one of the left and right platform sides.

15. The utility vehicle of claim 14, wherein the angled platform portion is angled relative to the platform plane by about 10 degrees to 45 degrees.

16. The utility vehicle of claim 14, wherein a center portion of the operator platform defines a width that is similar to a width of the support pad.

17. A utility vehicle comprising:
a frame carrying a prime mover and extending between a first end and a second end in a longitudinal direction;
ground engaging members operatively attached to the frame, wherein at least one of the ground engaging members is powered by the prime mover to propel the frame over a ground surface;
a control tower located at or near a rear end of the frame, the control tower carrying controls configured to be manipulated by an operator;
a tank positioned lateral to the control tower, wherein the tank defines an angled surface; and
a support pad connected to the control tower and configured to contact a leg of the operator, wherein a pad surface of the support pad is configured to align with a portion of the angled surface of the tank, and wherein the support pad contacts the tank when the support pad is deformed.

18. The utility vehicle of claim 17, wherein the pad surface of the support pad and the angled surface of the tank are coplanar at a region in which the pad surface and the angled surface are most proximate one another.

19. The utility vehicle of claim 17, wherein the support pad extends between a left side and a right side along a generally transverse direction, wherein the support pad defines a thickness at the left and right sides that is greater than a thickness at a middle portion between the left and right sides.

\* \* \* \* \*